(12) United States Patent
Knollman

(10) Patent No.: US 8,465,042 B2
(45) Date of Patent: Jun. 18, 2013

(54) UPPER COUPLER ASSEMBLY AND INSPECTION METHOD THEREFOR

(76) Inventor: Elvin Lloyd Knollman, Greensburg, IN (US)

( * ) Notice: Subject to any disclaimer, the term of this patent is extended or adjusted under 35 U.S.C. 154(b) by 404 days.

(21) Appl. No.: 12/760,969

(22) Filed: Apr. 15, 2010

(65) Prior Publication Data
US 2011/0089667 A1 Apr. 21, 2011

Related U.S. Application Data

(60) Provisional application No. 61/212,785, filed on Apr. 16, 2009, provisional application No. 61/214,265, filed on Apr. 22, 2009, provisional application No. 61/215,198, filed on May 1, 2009, provisional application No. 61/215,200, filed on May 1, 2009.

(51) Int. Cl.
*B62D 53/06* (2006.01)

(52) U.S. Cl.
USPC ............ 280/433; 280/421; 280/432; 73/40.7

(58) Field of Classification Search
USPC ................ 280/420, 421, 432, 433, 434, 495, 280/830, 831; 403/37; 73/40.7
See application file for complete search history.

(56) References Cited

U.S. PATENT DOCUMENTS

| 2,662,799 | A | | 12/1953 | Schaefer | |
|---|---|---|---|---|---|
| 2,665,177 | A | | 1/1954 | Schaefer | |
| 2,841,415 | A | | 7/1958 | Black | |
| 2,915,320 | A | | 12/1959 | Jewell et al. | |
| 2,968,496 | A | | 1/1961 | Gouirand | |
| 2,993,721 | A | * | 7/1961 | Bowman | ........................ 293/106 |
| 3,338,614 | A | * | 8/1967 | Sadler, Jr. | ...................... 293/106 |
| 3,612,569 | A | | 10/1971 | Marinelli | |
| 3,633,941 | A | | 1/1972 | Pleier | |
| 3,691,820 | A | * | 9/1972 | Fiore | .............................. 73/40.7 |
| 3,743,054 | A | | 7/1973 | Jones, Jr. | |
| 3,771,816 | A | | 11/1973 | Hord, Jr. | |
| 3,887,251 | A | | 6/1975 | McKay | |
| 3,990,720 | A | | 11/1976 | Schwartz | |
| 4,121,853 | A | | 10/1978 | McKay | |
| 4,487,446 | A | * | 12/1984 | Reich, II | ....................... 293/106 |
| 4,861,060 | A | | 8/1989 | Schult et al. | |
| 4,946,184 | A | | 8/1990 | Larocco | |
| 5,066,035 | A | | 11/1991 | Athans et al. | |
| 5,085,468 | A | * | 2/1992 | Billotte | ......................... 280/831 |
| 5,681,053 | A | | 10/1997 | Misukanis et al. | |
| 6,109,642 | A | * | 8/2000 | Schuettenberg | ............. 280/433 |
| 6,322,093 | B1 | | 11/2001 | Athans et al. | |

(Continued)

*Primary Examiner* — Kevin Hurley
*Assistant Examiner* — Marc A Scharich
(74) *Attorney, Agent, or Firm* — Hartman Global Ip Law; Gary M. Hartman; Domenica N. S. Hartman

(57) ABSTRACT

Upper coupler assemblies for mounting coupling devices to trailers, and methods for inspecting upper coupler assemblies. The upper coupler assemblies include a housing having first and second members that define a cavity therebetween. At least the second member has a through-hole adapted to receive a coupling device, such as a kingpin. The cavity contains at least one fluid-tight chamber, more preferably multiple gas-tight and liquid-tight chambers by walls within the cavity. The coupler assembly has at least one fluid inlet for introducing and/or withdrawing a fluid (liquid and/or gas) from one or more of the chambers. The integrity of the upper coupler assembly can be evaluated by introducing or removing a gas from the one or more chambers and detecting the presence of any gas leaks in the one or more chambers.

22 Claims, 4 Drawing Sheets

U.S. PATENT DOCUMENTS 6,565,109 B1 5/2003 Kloepfer
6,773,023 B2 8/2004 Athans et al.
7,451,995 B2 11/2008 Bloodworth et al.
7,607,677 B1 * 10/2009 Bosak .......................... 280/420
2008/0229568 A1 9/2008 Gross

* cited by examiner

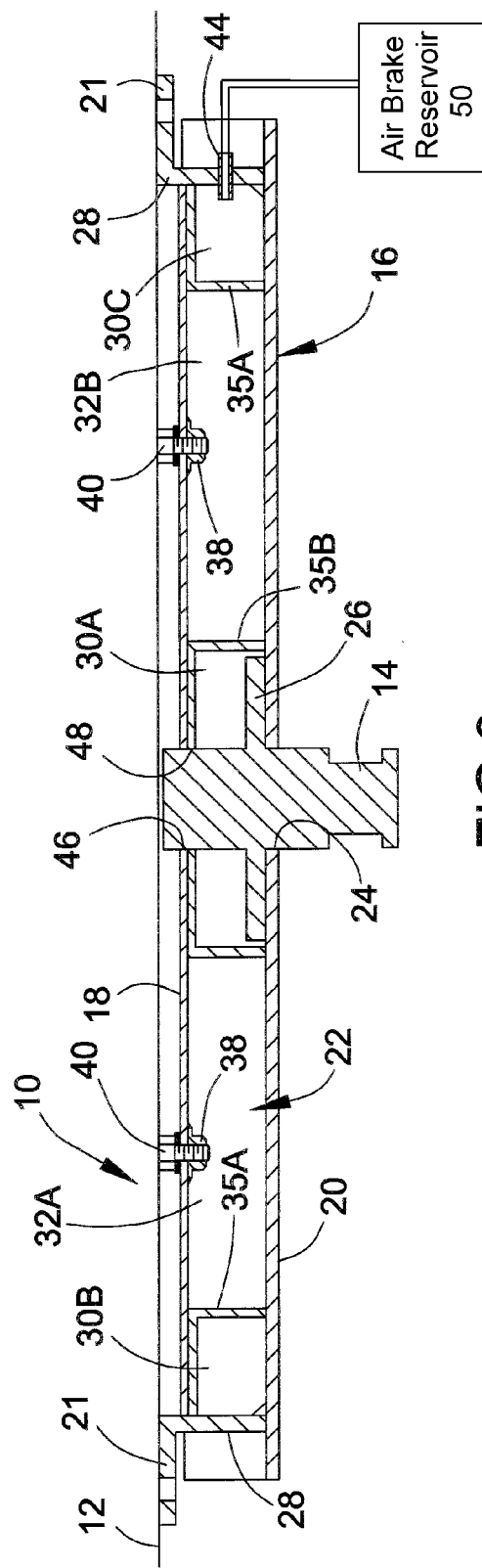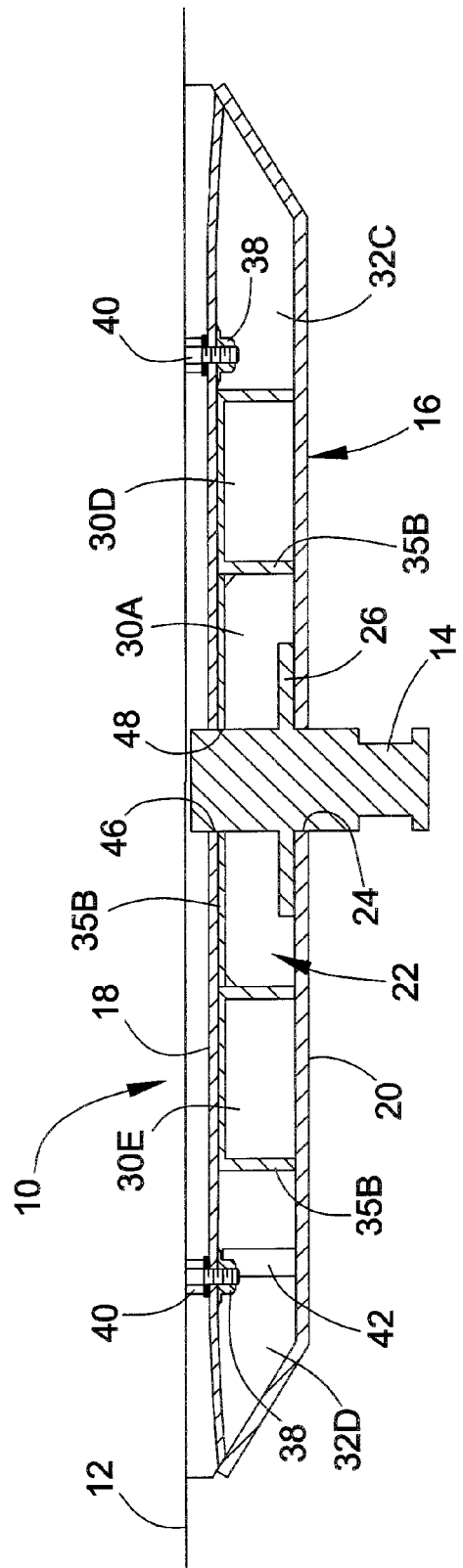

UPPER COUPLER ASSEMBLY AND INSPECTION METHOD THEREFOR

CROSS REFERENCE TO RELATED APPLICATIONS

This application claims the benefit of U.S. Provisional Application Nos. 61/212,785 filed Apr. 16, 2009, 61/214,265 filed Apr. 22, 2009, 61/215,198 filed May 1, 2009, and 61/215,200 filed May 1, 2009. The contents of these prior applications are incorporated herein by reference.

BACKGROUND OF THE INVENTION

The present invention generally relates to couplings by which two structures can be coupled together, and particularly to fifth wheel couplings adapted to secure trailers to tow vehicles.

Fifth wheel couplings are widely used as the connection between trailers, such as a semi-trailer, and vehicle adapted for towing trailers, such as a towing truck, tractor, recreational vehicle, etc. As used herein, the terms "trailer" and "vehicle" encompass, respectively, a wide variety of mobile equipment adapted to be directly or indirectly towed by a wide variety of self-propelled vehicle. Fifth wheel couplings typically comprise a downwardly-projecting coupling pin (commonly referred to as a kingpin) beneath the front end of a trailer, and a horseshoe-shaped coupling device (commonly referred to as the fifth wheel) located near the rear end of the vehicle. The kingpin is mounted to a trailer with what is commonly known as an upper coupler assembly. Upper coupler assemblies are typically made up of channel and/or angle iron and one or more plates, which are typically welded together to form an assembly that can be welded, bolted or secured in some other manner to a structural part of a trailer. Loads imposed on a kingpin are transferred to and from a trailer through its upper coupler assembly, such that upper coupler assemblies are subjected to considerable loads.

Because of the harsh environment encountered on roads and highways, especially as a result of the presence of salts and chemicals intended to melt snow and ice, as well as the corrosiveness of some materials hauled on a trailer, upper coupler assembly are subject to corrosion that can lead to structural failure. While mandatory inspections of coupler assemblies are a common practice, the effectiveness of these inspections is limited by the difficulty of quickly and reliably inspecting the integrity of the multiple joints that hold a coupler assembly together and to a trailer.

BRIEF DESCRIPTION OF THE INVENTION

The present invention provides upper coupler assemblies for mounting kingpins to trailers, methods for inspecting upper coupler assemblies, and methods for inhibiting corrosion of upper coupler assemblies.

According to a first aspect of the invention, an upper coupler assembly is provided that includes a housing comprising first and second members spaced apart from each other to define a cavity therebetween. At least the second member has a through-hole therein adapted to receive a coupling device (for example, a kingpin). The cavity contains at least one fluid-tight chamber, and more preferably a plurality of gas-tight and liquid-tight chambers separated within the cavity by walls attached to at least one of the first and second members. The upper coupler assembly further includes at least one fluid inlet that is adapted to introduce and withdraw a fluid (liquid and/or gas) from one or more of the chambers.

According to a second aspect of the invention, the method is provided for inspecting an upper coupler assembly that mounts a kingpin to the trailer so that a first portion of the kingpin is within the coupler assembly and a second portion of the kingpin protrudes outside the coupler assembly to enable coupling of a trailer to a vehicle. The method entails introducing or removing a gas from one or more of the fluid-tight chambers within a cavity within the upper coupler assembly. The integrity of the upper coupler assembly is then determined by detecting the presence of any gas leaks in the fluid-tight chamber(s). A particular example of such a method involves the use of the upper coupler assembly described above, and introducing a gas into the at least one fluid-tight chamber to detect leaks in the upper coupler assembly.

A significant advantage of this invention is the ability to reliably inspect the structural integrity of an upper coupler assembly and its attachment to a trailer through the detection of small cracks in the assembly, which if present will result in gas leakage when a gas is either evacuated from or introduced under pressure into a fluid-tight chamber within the upper coupler assembly.

Other aspects and advantages of this invention will be better appreciated from the following detailed description.

BRIEF DESCRIPTION OF THE DRAWINGS

FIGS. 3 and 4 are cross-sectional views along section lines 3-3 and 4-4 in FIG. 2.

DETAILED DESCRIPTION OF THE INVENTION

Figure 1:
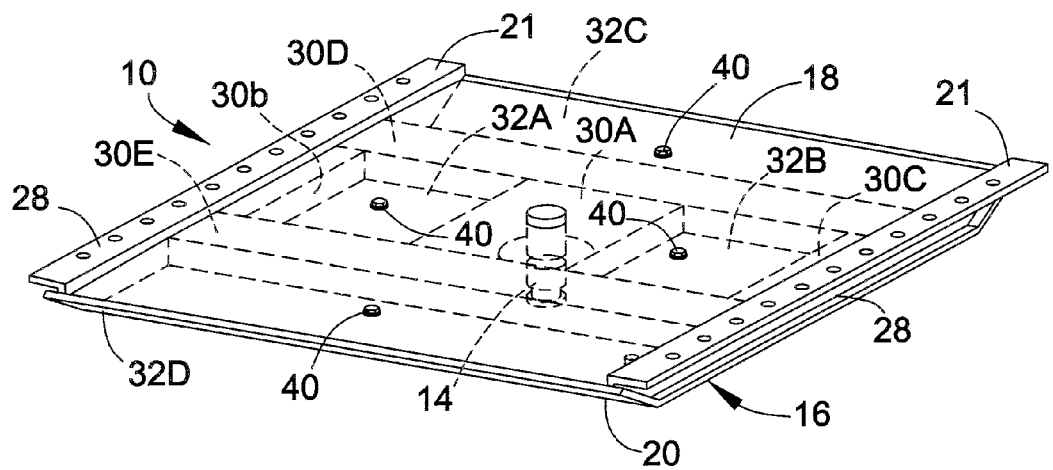
FIG. 1 is a perspective view of an upper coupler assembly that includes a kingpin mounted thereto in accordance with a first embodiment of this invention.

FIGS. 1 through 8 represent embodiments of upper coupler assemblies adapted for mounting a coupling device to a structure, a particular example of which is a kingpin adapted for coupling a trailer to a fifth wheel on a vehicle. To facilitate the descriptions of the upper coupler assemblies provided below, the terms "vertical," "horizontal," "front," "rear," "side," "upper," "lower," "above," "below," etc., will be used in reference to the orientation in which the coupler assemblies would be mounted beneath and near the front end of a trailer, and therefore are relative terms and should not be otherwise interpreted as limitations to the installation and use of the coupler assemblies, especially if used in other applications. For convenience, consistent reference numbers are used throughout the drawings to identify the same or functionally equivalent elements.

FIGS. 1 through 4 depict an upper coupler assembly 10 according to a first embodiment, and FIGS. 3 and 4 schematically represent the coupler assembly 10 mounted beneath and attached to a trailer 12. The dimensions of the coupler assembly 10 can vary widely, depending on the particular type of trailer 12 on which the coupler assembly 10 is to be installed and various other aspects of the particular application. Furthermore, the invention is not limited to any particular manner for mounting and attaching the coupler assembly 10 to the trailer 12. FIGS. 1 through 4 further represent the coupler assembly 10 equipped with a coupling device, and more particularly a kingpin 14 of a type capable of coupling to a fifth wheel on a tractor or other suitable type of towing vehicle. The coupler assembly 10 includes a housing 16, shown in FIGS. 1 through 4 as including an upper cover plate 18, a lower base plate 20, and two end plates 28. Various materials can be used to fabricate the plates 18, 20 and 28, including stainless steels, mild steels, etc. The cover and base plates 18 and 20 are represented as having generally rectangular shapes when viewed from above, and the perimeter of the cover plate 18 is preferably attached to the base plate 20 and end plates 28 by welding or another joining method. It is also foreseeable that the plates 18, 20 and 28 could be assembled with fasteners, though doing so would preferably provide a liquid-tight seal between the interfacing surfaces of the plates 18, 20 and 28 for reasons that will become evident from the following discussion. For the purpose of mounting the coupler assembly 10 beneath the trailer 12, the end plates 28 are shown as defining flanges 21 with holes for securing the coupler assembly 10 to the trailer 12 with bolts (not shown), though other techniques for securing the coupler assembly 10 to the trailer 12 are possible and within the scope of this invention. For example, trailers are manufactured to have coupler assemblies that are fully or partially integrated into the framework of the trailer. Such coupler assemblies, commonly referred to as inverted coupler assemblies, are often integrated into the framework of a trailer by welding or another assembly method that results in the coupler assembly being intended as a permanent part of the trailer. The coupler assembly 10 of this invention can also be fabricated to be fully or partially integrated into the framework of a trailer, and as such trailers equipped with inverted or otherwise integral coupler assemblies are also within the scope of this invention.

The plates 18 and 20 are spaced apart from each other in a vertical direction to define a cavity 22 therebetween (FIGS. 3 and 4). For this purpose, the base plate 20 is shown as having concave upper and convex lower surfaces, though it is foreseeable that the cavity 22 could be created in a different manner. The kingpin 14 is represented as being centrally disposed in the base plate 20, though other locations within the base plate 20 are foreseeable. For assembly of the kingpin 14 with the base plate 20, a through-hole 24 is preferably formed in the base plate 20 and sized to closely receive the kingpin 14 so that a gas-tight joint can be formed between the plate 20 and kingpin 14, for example, by welding the kingpin 14 to the base plate 20. For this purpose, the kingpin 14 is represented as having a flange 26 along whose perimeter a weldment (not shown) can be formed to attach the kingpin 14 to the base plate 20. The cover plate 18 is also shown as having a through-hole 46 that is also sized to closely receive the upper end of kingpin 14 to enable a gas-tight joint to be formed between the plate 18 and kingpin 14 by welding, etc.

As seen in FIGS. 1 through 4, the cavity 22 within the housing 16 contains multiple chambers 30A-30E and 32A-32D. While multiple chambers 30A-30E and 32A-32D are preferred, it is foreseeable that the housing 16 could comprise only one of the chambers 30A-30E and 32A-32D. At least one of the chambers 30A-30E and 32A-32D, and in preferred embodiments each chamber 30A-30E and 32A-32D, is fluid-tight, meaning that a fluid (liquid and/or gas) can be stored at pressures above atmospheric pressure within the chambers 30A-30E and 32A-32D. In the following discussion, the chambers 30A-30E will be designated as gas-tight chambers while the chambers 32A-32D will be designated as liquid-tight chambers. The chambers 30A-30E and 32A-32D are delineated and separated within the cavity 22 by walls 34 extending between the plates 18 and 20. In what is believed to be a preferred embodiment, the walls 34 are represented in FIGS. 3 and 4 as formed by pieces 35A with L-shaped cross-sections that are welded or otherwise attached to the end plates 28 and concave surface of the base plate 20, or pieces 35B with U-shaped cross-sections that are welded or otherwise attached to the concave surface of the base plate 20. According to this embodiment, the interiors of the walls 34 define the gas-tight chambers 30A-30E, whereas the liquid-tight chambers 32A-32D are defined by the remainder of the cavity 22 outside the walls 34.

One chamber 30A of the gas-tight chambers 30A-30E is shown surrounding the through-hole 24 in the base plate 20 and containing a portion of the kingpin 14 within the housing 16. Because the embodiment of FIGS. 1 through 4 shows the kingpin 14 centrally disposed in the base plate 20, the chamber 30A is also centrally-located in the base plate 20, though other locations are foreseeable. As with the cover plate 18, the wall piece 35B defining the central gas-tight chamber 30A has a through-hole 48 sized to closely receive the upper end of pin 14 to enable a gas-tight joint to be formed between the piece 35B and kingpin 14 by welding, etc. Two other gas-tight chambers 30B and 30C are located to either side of the central chamber 30A, and are separated from the central chamber 30A by two of the liquid-tight chambers 32A and 32B. Two additional gas-tight chambers 30D and 30E are located alongside opposite sides of the three previously-described gas-tight chambers 30A-30C, and two liquid-tight chambers 32C and 32D are located alongside the gas-tight chambers 30D and 30E. In a preferred embodiment, the gas-tight chambers 30D and 30E are fluidically connected to each of the three chambers 30A-30C through vents 36 so that the gas-tight chambers 30A-30E define a continuous gas-tight circuit within the cavity 22 that is fluidically separate from the liquid-tight chambers 32A-32D.

Figure 2:
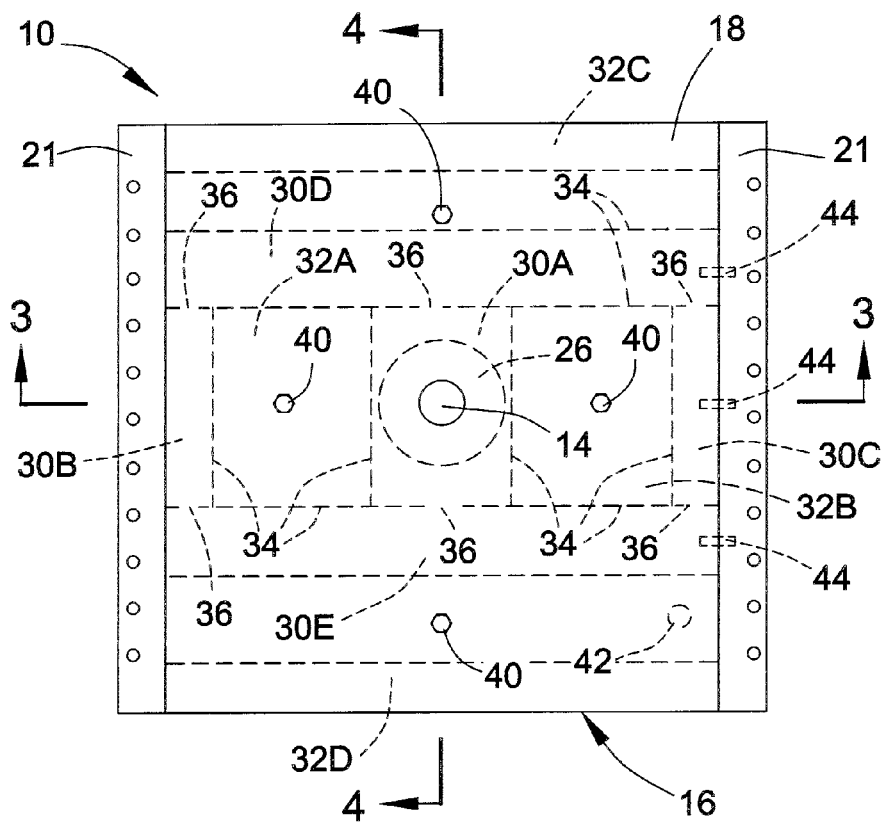
FIG. 2 represents a plan view of the upper coupler assembly of FIG. 1.
Figure 5:
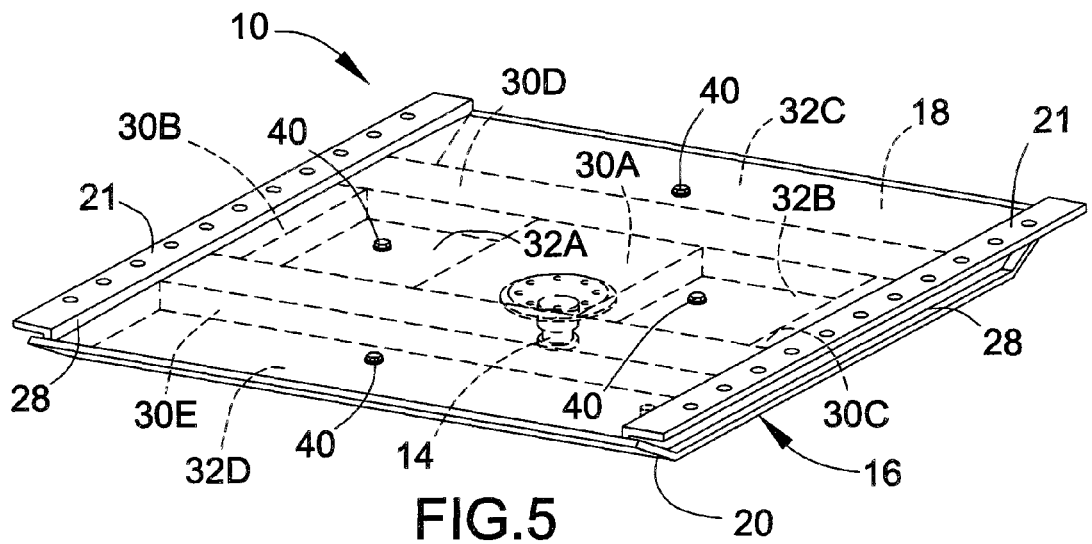
FIGS. 5 and 6 are perspective and side views, respectively, of an upper coupler assembly that includes a kingpin mounted thereto in accordance with another embodiment of this invention.
Figure 6:
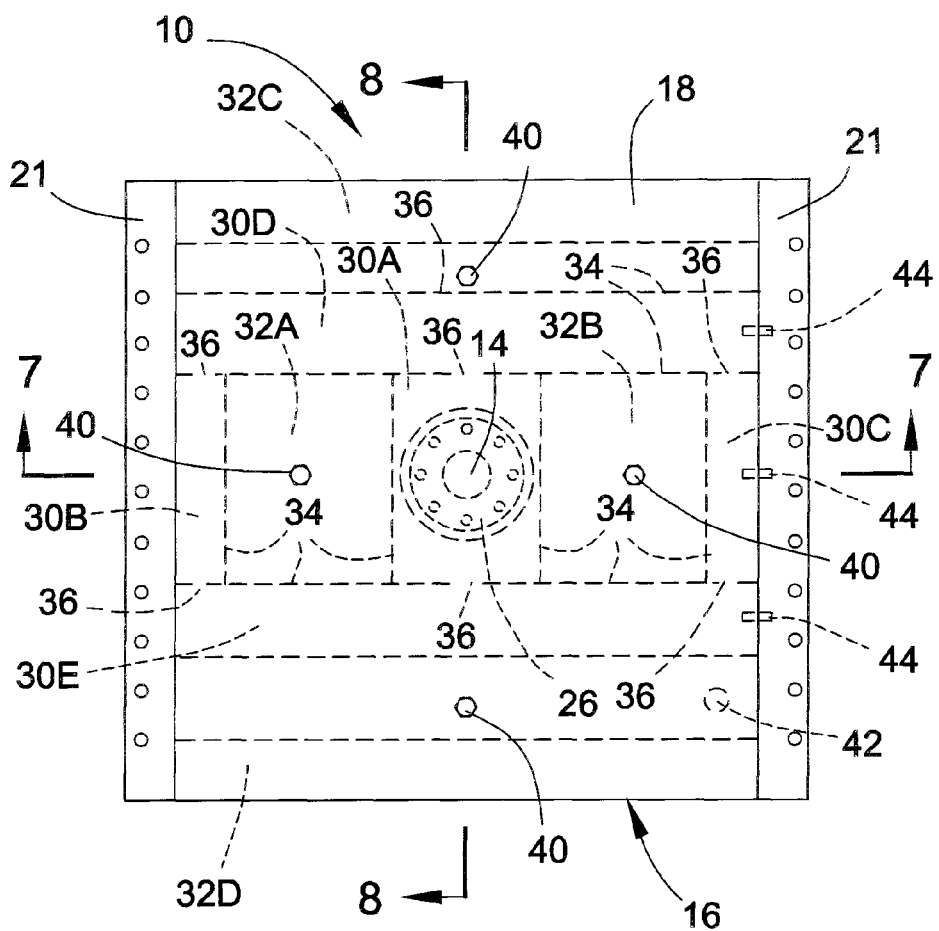
Figure 7:
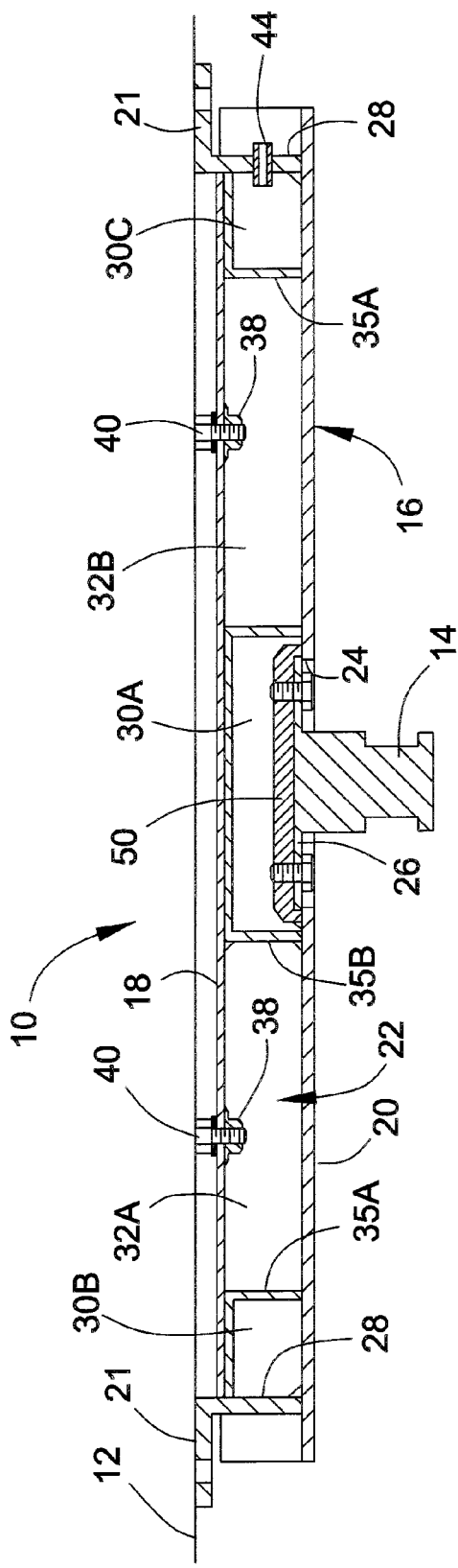
FIGS. 7 and 8 are cross-sectional views along section lines 7-7 and 8-8 in FIG. 6.
Figure 8:
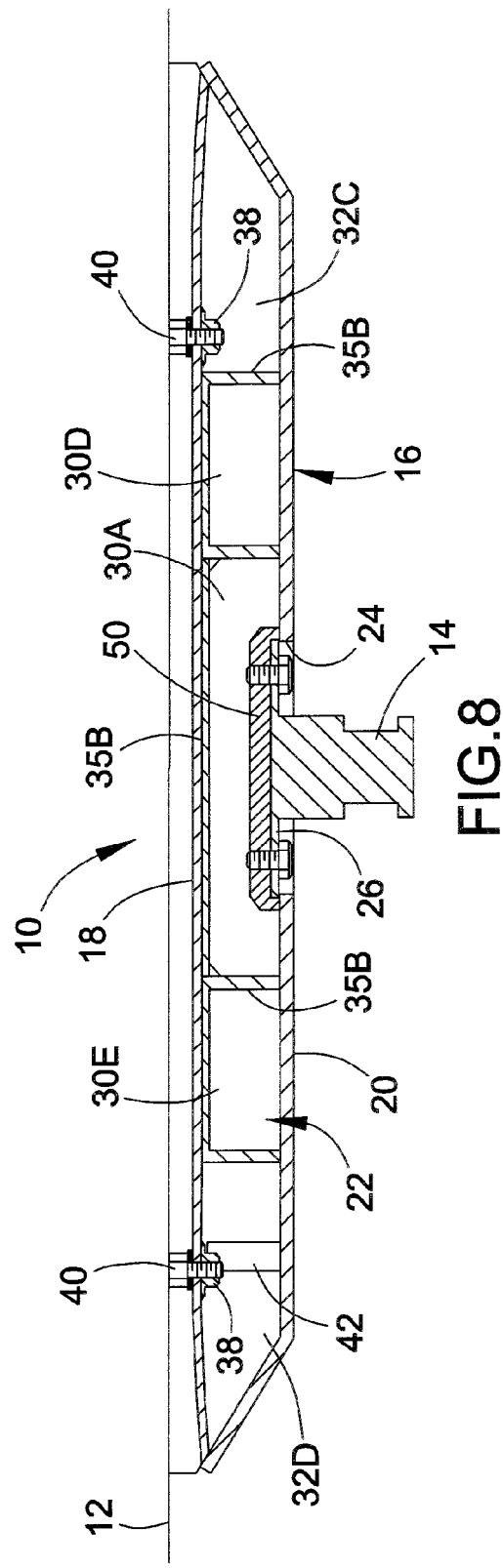

As viewed in FIG. 2, the gas-tight circuit roughly has a figure-eight shape, though this is not a requirement of the invention. The liquid-tight chambers 32A-32D can be seen to contact all of the walls 34 used define and enclose the gas-tight chambers 30A-30E. A particular benefit of this arrangement is obtained by introducing into the chambers 32A-32D a liquid that is capable of inhibiting corrosion, with the result that the walls 34 resist corrosion as a result of constantly contacting and being bathed in the corrosion-inhibiting liquid. Suitable liquids include hygroscopic liquids such as glycerol and various automotive-type lubricants and oils. For the purpose of introducing the liquid into the liquid-tight chambers 32A-32D, inlet ports 38 and plugs 40 are shown as being provided in the cover plate 18. Because they are not fluidically connected, each liquid-tight chamber 32A-32D is shown as being equipped with an inlet port 38.

A significant aspect of inhibiting corrosion of the walls 34 with the corrosion-inhibiting liquid within the liquid-tight chambers 32A-32D is the manner in which one or more of the gas-tight chambers 30A-30E can be used to test the structural integrity of the coupler assembly 10. In preferred embodiments, all of the gas-tight chambers 30A-30E are adapted to undergo pressure and/or vacuum testing for the purpose of detecting gas leakages in the walls 34 and welds that define the gas-tight chambers 30A-30E, providing a direct indication as to the integrity of the coupler assembly 10 and its attachment to the trailer 12. For this purpose, one or more gas inlets 44 (FIGS. 2 and 3) are located in at least one of the end walls 28 of the housing 16. The inlets 44 permit a gas (for example, air, nitrogen, etc.) to be introduced and/or withdrawn from the gas-tight chambers 30A-30E. The inlets 44 are preferably threaded to accept a fitting or nozzle (not shown) to permit the coupling of a compressor or vacuum pump to any one or more of the inlets 44. In use, the gas-tight chambers 30A-30E may be evacuated (i.e., below atmospheric pressure) or contain a pressurized gas (i.e., above atmospheric pressure) only during inspections. Alternatively, the gas-tight chambers 30A-30E may be evacuated or pressurized with a gas during routine use of the trailer 12, such as by supplying the chambers 30A-30E with air, for example, from an air brake reservoir 50 on the trailer 12 (FIG. 3).

After the coupler assembly 10 has been installed on the trailer 12, the integrity of the coupler assembly 10 can be tested at any convenient opportunity by simply connecting a suitable pressure source (such as an air compressor, the air brake reservoir 50, etc.) or a suitable vacuum pump to a gas inlet 44 and then pressurizing or evacuating the gas-tight chambers 30A-30E to detect the possible presence of a gas leak in one of the chambers 30A-30E. According to a preferred aspect of the invention, a vent pipe 42 is shown fluidically connected to one of the liquid-tight chambers 32 in FIG. 4. The vent pipe 42, which can be normally closed with a plug (not shown), is intended to serve as a vent through which air or other gas used to pressurize the gas-tight chambers 30A-30E is able to escape the housing 16 and can be readily detected during inspection if a crack is present in one of the walls 34 enclosing the gas-tight circuit formed by the gas-tight chambers 30A-30E. The pipe 42 protrudes into one of the liquid-tight chambers 32A-32D and has an open end spaced a minimal distance from the cover plate 18 to minimize leakage of the corrosion-inhibiting fluid during inspections.

In view of similarities between the two illustrated embodiments of the invention, the following discussion of FIGS. 5 through 8 will focus primarily on aspects of the second embodiment that differ from the first embodiment in some notable or significant manner. Other aspects of the second embodiment not discussed in any detail can be, in terms of structure, function, materials, etc., essentially as was described for the first embodiment.

The coupler assembly 10 of FIGS. 5 through 8 differs primarily from that of FIGS. 1 through 4 as a result of the kingpin 14 having a replaceable configuration. In particular, the kingpin 14 can be seen in FIGS. 7 and 8 as removably secured with a clamping plate 50 and fasteners to the base plate 20 so as to close the through-hole 24 in the base plate 20, which is larger in diameter than the through-hole 24 in FIGS. 1 through 4. The flange 26 of the kingpin 14 is smaller in diameter than the through-hole 24 in the base plate 20, allowing the kingpin 14 to be welded or otherwise secured to the base plate 20. Also in contrast to the embodiment of FIGS. 1-4, the cover plate 18 lacks a through-hole 46, such that the upper end of the kingpin 14 is entirely closed within the chamber 30A.

While the invention has been described in terms of specific embodiments, it is apparent that other forms could be adopted by one skilled in the art. For example, the physical configuration and assembly of the coupler assemblies 10 and their components could differ from that shown, and materials and processes other than those noted could be used. Therefore, the scope of the invention is to be limited only by the following claims.

The invention claimed is:

1. An upper coupler assembly for mounting a coupling device on a trailer, the upper coupler assembly comprising:
   a housing comprising first and second members spaced apart from each other to define a cavity therebetween, the second member having a through-hole therein adapted to receive a coupling device;
   at least two fluid-tight chambers within the cavity and defined by one or more walls attached to at least one of the first and second members, at least one of the fluid-tight chambers comprises at least one gas-tight chamber and at least one of the fluid-tight chambers comprises at least one liquid-tight chamber; and
   at least one inlet adapted to introduce and withdraw a fluid from the at least two fluid-tight chambers.

2. The upper coupler assembly according to claim 1, wherein the at least one liquid-tight chamber contains a corrosion-inhibiting liquid.

3. The upper coupler assembly according to claim 1, wherein the at least one gas-tight chamber contains a gas.

4. The upper coupler assembly according to claim 1, wherein the at least one gas-tight chamber comprises a plurality of gas-tight chambers and wherein the at least one liquid-tight chamber comprises a plurality of liquid-tight chambers, the plurality of gas-tight chambers and the plurality of liquid-tight chambers separated within the cavity by the one or more walls, and the at least one inlet comprises at least one gas inlet adapted to introduce and withdraw a gas from the plurality of gas-tight chambers and at least one liquid inlet adapted to introduce a liquid into the plurality of liquid-tight chambers.

5. The upper coupler assembly according to claim 4, wherein at least some of the gas-tight chambers are fluidically connected to define a continuous gas-tight circuit within the cavity.

6. The upper coupler assembly according to claim 4, wherein all of the gas-tight chambers are fluidically connected to define a continuous gas-tight circuit within the cavity.

7. The upper coupler assembly according to claim 4, wherein the liquid-tight chambers are not fluidically connected to each other.

8. The upper coupler assembly according to claim 7, wherein the at least one liquid inlet comprises a plurality of liquid inlets adapted to separately introduce a liquid into each of the liquid-tight chambers.

9. The upper coupler assembly according to claim 4, wherein the liquid-tight chambers comprise first and second liquid-tight chambers disposed at oppositely-disposed first and second extents of the cavity, and third and fourth liquid-tight chambers disposed between the first and second liquid-tight chambers.

10. The upper coupler assembly according to claim 9, wherein the first, second, third and fourth liquid-tight chambers are separated from each other by the gas-tight chambers.

11. The upper coupler assembly according to claim 4, wherein the liquid-tight chambers contain a corrosion-inhibiting liquid.

12. The upper coupler assembly according to claim 11, wherein each of the one or more walls separates at least one of the gas-tight chambers from at least one of the liquid-tight chambers, and the liquid inhibits corrosion of the one or more walls so as to inhibit gas flow into and out of the gas-tight chambers through the one or more walls.

13. The upper coupler assembly according to claim 4, further comprising a vent pipe in the second member, protruding into one of the liquid-tight chambers, and having an open end spaced apart from the first member.

14. The upper coupler assembly according to claim 4, wherein the gas-tight chambers contain a pressurized gas.

15. The upper coupler assembly according to claim 14, wherein the gas-tight chambers are coupled to an air brake reservoir on the trailer so as to receive pressurized air from the air brake reservoir.

16. The upper coupler assembly according to claim 4, wherein the gas-tight chambers are at least partially evacuated so as to be at less than atmospheric pressure.

17. The upper coupler assembly according to claim 1, further comprising the coupling device disposed within the through-hole in the second member and forming a gas-tight seal therewith, wherein the coupling device comprises a kingpin having a first portion within the at least one gas-tight chamber and a second portion protruding outside the housing.

18. The upper coupler assembly according to claim 17, wherein the kingpin is welded to the second member so as to seal the through-hole in the second member and form the gas-tight seal therewith.

19. The upper coupler assembly according to claim 17, wherein the kingpin is removably secured with fasteners to the second member so as to close the through-hole in the second member.

20. The upper coupler assembly according to claim 1, wherein the upper coupler assembly is an inverted coupler assembly that is at least partially integrated into framework of the trailer.

21. A method of inspecting the upper coupler assembly according to claim 1, the method comprising introducing a gas into the at least one gas-tight chamber to detect leaks in the housing.

22. A method of inhibiting corrosion of the upper coupler assembly according to claim 1, the method comprising introducing a corrosion-inhibiting material into the at least one liquid-tight chamber.

* * * * *